US009489049B2

(12) United States Patent
Li (10) Patent No.: US 9,489,049 B2
(45) Date of Patent: Nov. 8, 2016

(54) FORCE SIMULATION FINGER SLEEVE USING ORTHOGONAL UNIFORM MAGNETIC FIELD

(71) Applicant: Samsung Electronics Co., Ltd., Suwon-si, Gyeonggi-do (KR)

(72) Inventor: Zhiyun Li, Kenmore, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 14/469,001

(22) Filed: Aug. 26, 2014

(65) Prior Publication Data

US 2016/0062460 A1    Mar. 3, 2016

(51) Int. Cl.
| | |
|---|---|
| G06F 3/01 | (2006.01) |
| G06F 3/039 | (2013.01) |
| G06F 3/041 | (2006.01) |
| G06F 3/0354 | (2013.01) |
| G06F 3/046 | (2006.01) |

(52) U.S. Cl.
CPC ............... G06F 3/016 (2013.01); G06F 3/039 (2013.01); G06F 3/03545 (2013.01); G06F 3/041 (2013.01); G06F 3/046 (2013.01); G06F 2203/0331 (2013.01)

(58) Field of Classification Search
CPC ........ G06F 3/011; G06F 3/016; G06F 3/046; G06F 3/0416; G06F 3/03545; G06F 2203/0331; G06F 19/3481; G06F 3/039; G06F 3/041
USPC ........................................................ 345/174
See application file for complete search history.

(56) References Cited

U.S. PATENT DOCUMENTS

| | | | | |
|---|---|---|---|---|
| 4,514,688 A | * | 4/1985 | Whetstone | G01B 7/004 178/18.02 |
| 5,825,308 A | * | 10/1998 | Rosenberg | G05G 9/047 341/20 |
| 7,289,109 B2 | * | 10/2007 | Jaeger | G06F 3/03545 345/161 |
| 7,924,145 B2 | * | 4/2011 | Yuk | G06F 3/03547 340/407.1 |
| 8,232,969 B2 | * | 7/2012 | Grant | G06F 3/016 178/18.07 |
| 2005/0116940 A1 | * | 6/2005 | Dawson | G06F 3/03545 345/179 |
| 2005/0243072 A1 | * | 11/2005 | Denoue | G06F 3/016 345/179 |
| 2006/0109254 A1 | * | 5/2006 | Akieda | G06F 3/016 345/173 |

(Continued)

FOREIGN PATENT DOCUMENTS

| | | |
|---|---|---|
| EP | 2 407 863 A2 | 1/2012 |
| EP | 2 743 798 A1 | 6/2014 |

*Primary Examiner* — Tom Sheng
(74) *Attorney, Agent, or Firm* — Jefferson IP Law, LLP (57) ABSTRACT

An apparatus and method for providing feedback to a user of an electronic device is provided. The apparatus includes a magnetic user input device, a touch panel display configured to display application output and to receive application input, a series of solenoids positioned on each side of or wrapped around the touch panel display, the series of solenoids configured to output a magnetic field, and a processor programmed to execute an application that displays the application output via the touch panel display and in response to input received from the touch panel, drives a separate current to each solenoid of the series of solenoids to apply a force against the magnetic user input device.

12 Claims, 9 Drawing Sheets

(56) References Cited

U.S. PATENT DOCUMENTS

| | | | |
|---|---|---|---|
| 2011/0181404 A1* | 7/2011 | Xavier | G06F 3/03547 340/407.1 |
| 2012/0013530 A1* | 1/2012 | Tsuboi | G02B 27/2214 345/157 |
| 2012/0026180 A1* | 2/2012 | Kuchenbecker | G06F 3/016 345/582 |
| 2013/0127759 A1* | 5/2013 | Bae | G06F 3/041 345/173 |
| 2013/0249871 A1* | 9/2013 | Yoo | G06F 3/046 345/179 |
| 2014/0168175 A1* | 6/2014 | Mercea | G06F 3/03545 345/179 |
| 2014/0281950 A1* | 9/2014 | White | G06F 3/0488 715/269 |
| 2015/0007025 A1* | 1/2015 | Sassi | H04M 19/047 715/702 |

* cited by examiner

FORCE SIMULATION FINGER SLEEVE USING ORTHOGONAL UNIFORM MAGNETIC FIELD

TECHNICAL FIELD

The present disclosure relates to an apparatus and method for providing feedback to a user of a finger sleeve when the user provides input to an electronic device.

BACKGROUND

Electronic devices provide feedback to a user in number of different forms. Common forms of feedback are visual, audio and haptic. The visual feedback is commonly displayed on a Liquid Crystal Display (LCD). The audio feedback is commonly transmitted through a speaker of the electronic device or remotely via a pair of ear buds that may be wiredly or wirelessly connected to the electronic device. The haptic feedback is commonly transmitted via a vibration motor. The vibration motor may be oriented in such a manner as to transmit vibrations in different directions on an X/Y plane parallel to a face of the electronic device.

While the vibrations transmitted via the vibration motor provide feedback they do not provide a force in relationship to an item the user may be manipulating on the LCD.

Accordingly, an apparatus and a method thereof that provides force against an input device used on a LCD or another display type in response to an item being manipulated on the display is desired.

SUMMARY

Aspects of the present disclosure are to address at least the above-mentioned problems and/or disadvantages and to provide at least the advantages described below. Accordingly, an aspect of the present disclosure is to provide an apparatus for providing physical resistance feedback to a user of an electronic device.

In accordance with an aspect of the present disclosure, an apparatus for providing feedback to a user of an electronic device is provided. The apparatus includes a magnetic user input device, a touch panel display configured to display application output and to receive application input, a series of solenoids positioned on each side of the touch panel display, the series of solenoids configured to output a magnetic field, and a processor programmed to execute an application that displays the application output via the touch panel display and in response to input received from the touch panel, drives a separate current to each solenoid of the series of solenoids to apply a force against the magnetic user input device.

In accordance with an aspect of the present disclosure, a method of providing feedback to a user of an electronic device is provided. The method includes displaying application output and receiving application input on a touch panel display, and receiving a force against a magnetic user input device from a magnetic field driven about the touch panel display in response to an application responding to the displayed application output and the received application input. The magnetic field is driven by a series of solenoids positioned on each side of the touch panel display or below the touch panel display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method providing weighted physical feedback to a user of an electronic device.

Figure 1:
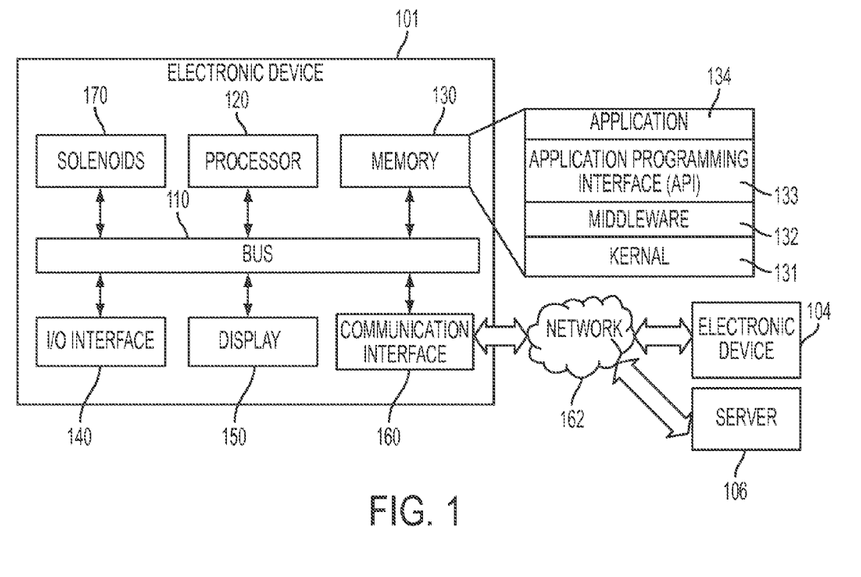
FIG. 1 illustrates a network environment including an electronic device according to various embodiments of the present disclosure.

FIG. 1 illustrates a network environment including an electronic device according to various embodiments of the present disclosure.

Referring to FIG. 1, a network environment 100 includes an electronic device 101. The electronic device 101 may include a bus 110, a processor 120, a memory 130, an Input/Output (I/O) interface 140, a display 150, a communication interface 160, solenoids 170, and/or the like.

The bus 110 may be circuitry that connect the foregoing components and allow communication between the foregoing components. For example, the bus 110 may connect components of the electronic device 101 so as to allow control messages and/or other information to be communicated between the connected components.

The processor 120 may, for example, receive instructions from other components (e.g., the memory 130, the I/O interface 140, the display 150, the communication interface 160, the solenoids 170, and/or the like), interpret the received instructions, and execute computation or data processing according to the interpreted instructions.

The memory 130 may, for example, store instructions and/or data that are received from, and/or generated by, other components (e.g., the memory 130, the I/O interface 140, the display 150, the communication interface 160, the solenoids module 170, and/or the like). For example, the memory 130 may include programming modules such as a kernel 131, a middleware 132, an Application Programming Interface (API) 133, an application 134, and/or the like. Each of the foregoing programming modules may include a combination of at least two of software, firmware, or hardware.

The kernel 131 may control or manage system resources (e.g., the bus 110, the processor 120, the memory 130, and/or the like) that may be used in executing operations or functions implemented in other programming modules such as, for example, the middleware 132, the API 133, the application 134, and/or the like. The kernel 131 may provide an interface for allowing or otherwise facilitating the middleware 132, the API 133, the application 134, and/or the like, to access individual components of electronic device 101.

The middleware 132 may be a medium through which the kernel 131 may communicate with the API 133, the application 134, and/or the like to send and receive data. The middleware 132 may control (e.g., scheduling, load balancing, and/or the like) work requests by one or more applications 134. For example, the middleware 132 may control work requests by one or more applications 134 by assigning priorities for using system resources (e.g., the bus 110, the processor 120, the memory 130, and/or the like) of electronic device 101 to the one or more applications 134.

The API 133 may be an interface that may control functions that the application 134 may provide at the kernel 131, the middleware 132, and/or the like. For example, the API 133 may include at least an interface or a function (e.g., command) for file control, window control, video processing, character control, and/or the like.

According to various embodiments of the present disclosure, the application 134 may include a Short Message Service (SMS) application, a Multimedia Messaging Service (MMS) application, an email application, a calendar application, an alarm application, a health care application (e.g., an exercise amount application, a blood sugar level measuring application, and/or the like), an environmental information application (e.g., an application that may provide atmospheric pressure, humidity, temperature information, and/or the like), an instant messaging application, a call application, an internet browsing application, a gaming application, a media playback application, an image/video capture application, a file management application, and/or the like. In addition to or as an alternative to, the application 134 may be an application that is associated with information exchange between the electronic device 101 and an external electronic device (e.g., electronic device 104). As an example, the application 134 that is associated with the information exchange may include a notification relay application that may provide the external electronic device with a certain type of information, a device management application that may manage the external electronic device, and/or the like.

As an example, the notification relay application may include a functionality that provides notification generated by other applications at electronic device 101 (e.g., the SMS/MMS application, the email application, the health care application, the environmental information application, the instant messaging application, the call application, the internet browsing application, the gaming application, the media playback application, the image/video capture application, the file management application, and/or the like) to an external electronic device (e.g., the electronic device 104). In addition to or as an alternative to, the notification relay application may provide, for example, receive notification from an external electronic device (e.g., the electronic device 104), and may provide the notification to a user.

As an example, the device management application may manage enabling or disabling of functions associated with least a portion of an external electronic device (e.g., the external electronic device itself, or one or more components of the external electronic device) in communication with electronic device 101, controlling of brightness (or resolution) of a display of the external electronic device, an application operated at, or a service (e.g., a voice call service, a messaging service, and/or the like) provided by, the external electronic device, and/or the like.

According to various embodiments of the present disclosure, as an example, the application 134 may include one or more applications that are determined according to a property (e.g., type of electronic device, and/or the like) of the external electronic device (e.g., the electronic device 104). For example, if the external electronic device is an mp3 player, the application 134 may include one or more applications related to music playback. As another example, if the external electronic device is a mobile medical device, the application 134 may be a health care-related application. According to various embodiments of the present disclosure, the application 134 may include at least one of an application that is preloaded at the electronic device 101, an application that is received from an external electronic device (e.g., the electronic device 104, a server 106, and/or the like), and/or the like.

The I/O interface 140 may, for example, receive instruction and/or data from a user. The I/O interface 140 may send the instruction and/or the data, via the bus 110, to the processor 120, the memory 130, the communication interface 160, the solenoids 170, and/or the like. For example, the I/O interface 140 may provide data associated with user input received via a touch screen to the processor 120. The I/O interface 140 may, for example, output instructions and/or data received via the bus 110 from the processor 120, the memory 130, the communication interface 160, the solenoids module 170, and/or the like, via an I/O device (e.g., a speaker, a display, and/or the like). For example, the I/O interface 140 may output voice data (e.g., processed using the processor 120) via a speaker.

The display 150 may display various types of information (e.g., multimedia, text data, and/or the like) to the user. As an example, the display 150 may display a Graphical User Interface (GUI) with which a user may interact with the electronic device 101.

The communication interface 160 may provide communication between electronic device 101 and one or more external electronic devices (e.g., the electronic device 104, the server 106, and/or the like). For example, the communication interface 160 may communicate with the external electronic device by establishing a connection with a network 162 using wireless or wired communication. As an example, wireless communication with which the communication interface 160 may communicate may be at least one of, Wi-Fi, Bluetooth, Near Field Communication (NFC), Global Positioning System (GPS), cellular communication (e.g., Long Term Evolution (LTE), LTE Advanced (LTE-A), Code Division Multiple Access (CDMA), Wideband-CDMA (WDCMA), Universal Mobile Telecommunications System (UMTS), Wireless Broadband (WiBro), Global System for Mobile Communications (GSM), and/or the like), Infrared Data Association (IrDA) technology, and/or the like. As an example, wired communication with which the communication interface 160 may communicate may be at least one of, for example, Universal Serial Bus (USB), High Definition Multimedia Interface (HDMI), Recommended Standard 232 (RS-232), Plain Old Telephone Service (POTS), Ethernet, and/or the like.

According to various embodiments of the present disclosure, the network 162 may be a telecommunications network. As an example, the telecommunications network may include at least one of a computer network, the Internet, the Internet of Things, a telephone network, and/or the like. According to various embodiments of the present disclosure, a protocol (e.g., a transport layer protocol, a data link layer protocol, a physical layer protocol, and/or the like) for communicating between electronic device 101 and an external electronic device may be supported by, for example, at least one of the application 134, the API 133, the middleware 132, the kernel 131, the communication interface 160, and/or the like.

The solenoids module 170 may, for example, process at least a part of information received from other components (e.g., the processor 120, the memory 130, the I/O interface 140, the communication interface 160, and/or the like), and provide various information, services, and/or the like to the user in various manners. For example, the solenoids module 170 may control via the processor 120 or independently at least some of the functions of the electronic device 101 to communicate or connect to another electronic device (e.g., the electronic device 104, the server 106, and/or the like). FIG. 4 will provide additional information regarding the solenoids module 170.

Figure 2A:
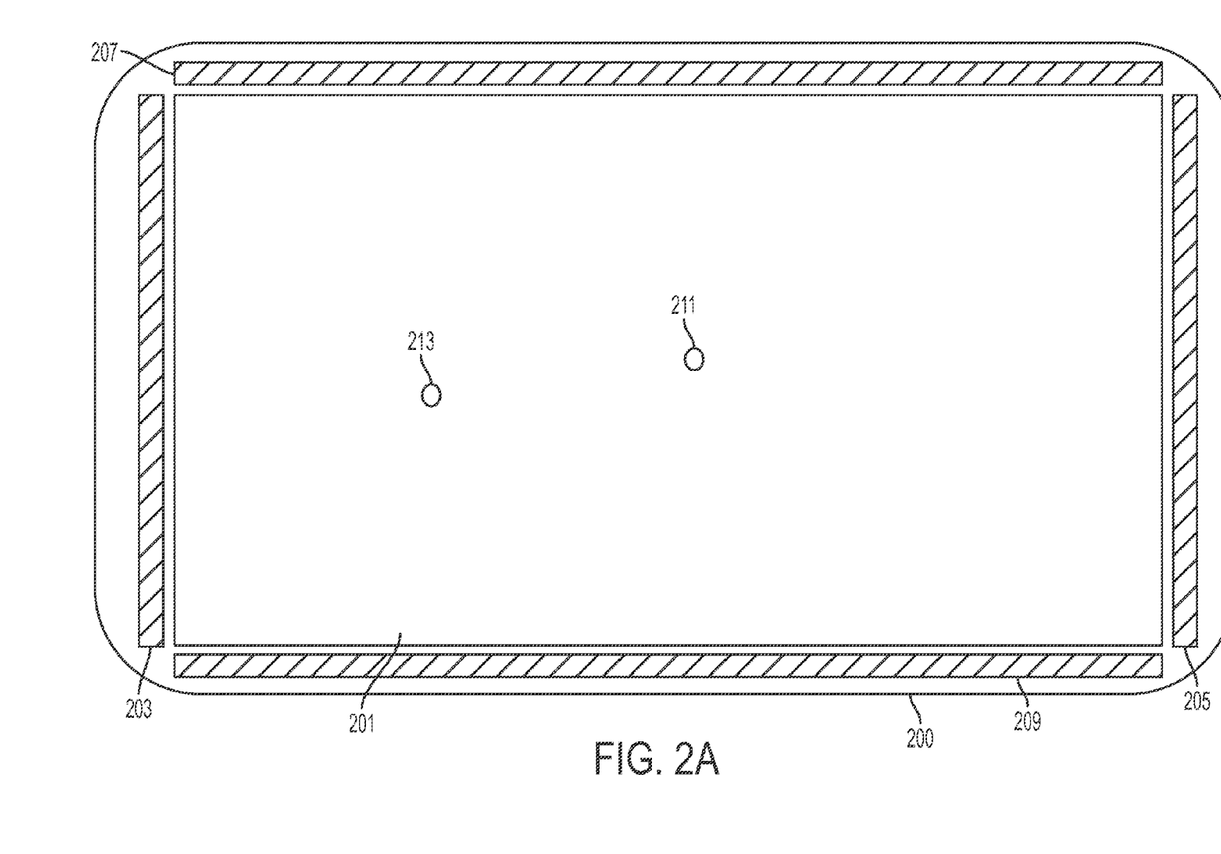
FIGS. 2A and 2B illustrate a top view of a display of an electronic device with a series of solenoids mounted thereon according to an embodiment of the present disclosure.
Figure 2B:
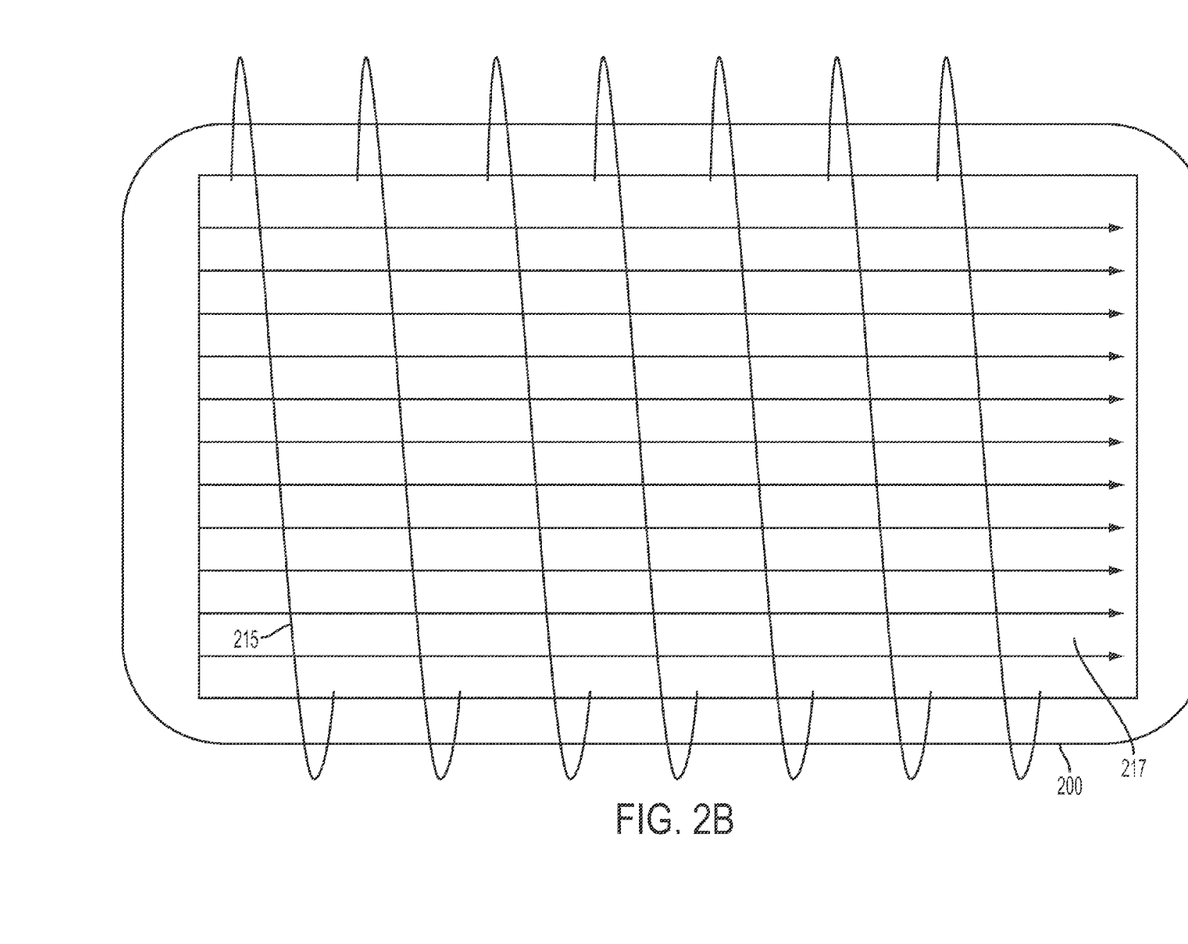

FIGS. 2A and 2B illustrate a top view of a display of an electronic device with a series of solenoids mounted thereon according to an embodiment of the present disclosure.

Figure 3:
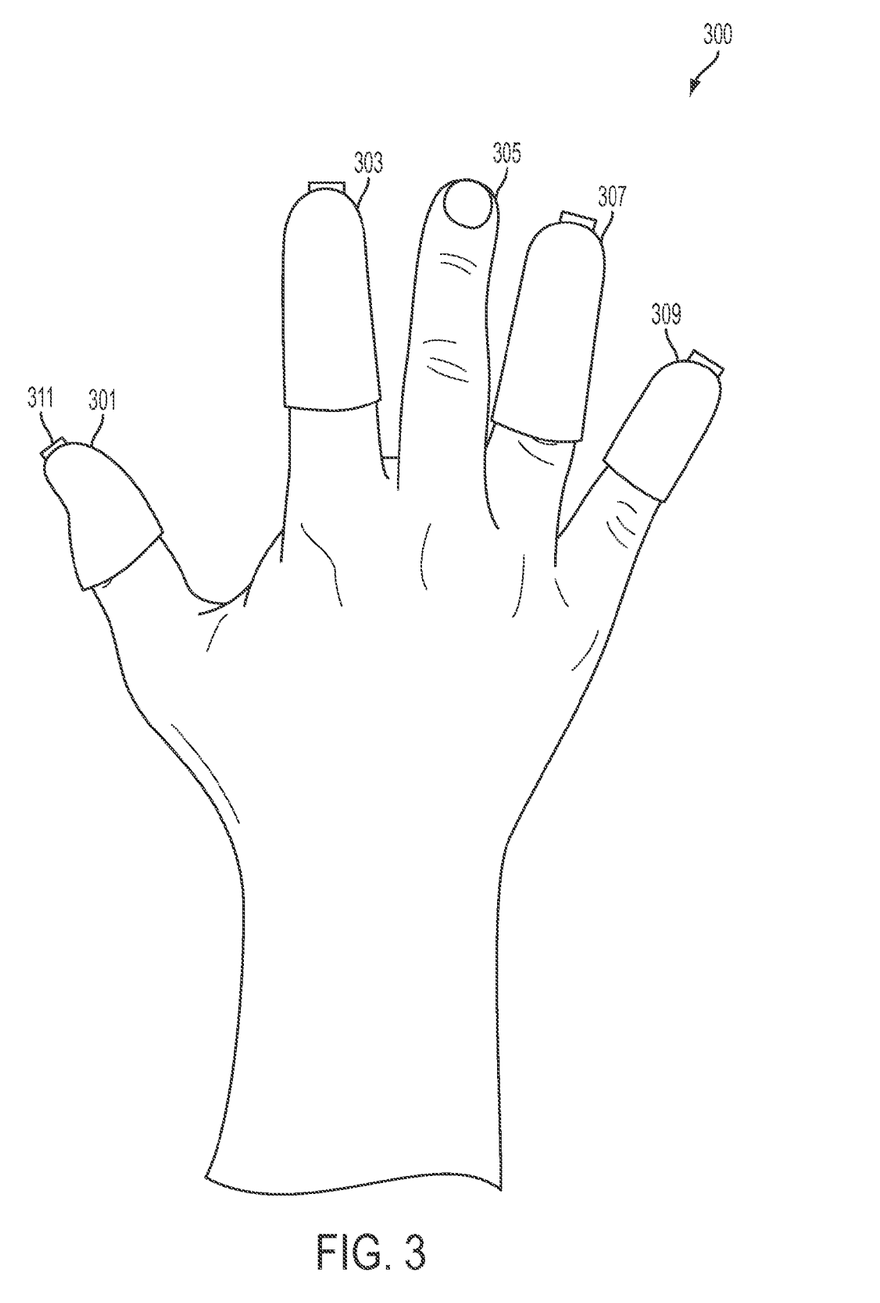
FIG. 3 illustrates a front view of a user's hand with magnetic finger sleeves according to an embodiment of the present disclosure.

FIG. 3 illustrates a front view of a user's hand with magnetic finger sleeves according to an embodiment of the present disclosure.

Referring to FIGS. 2A, 2B and 3, an electronic device 200 includes a touch panel display 201, and a series of solenoids 203, 205, 207, and 209 mounted on each edge of the touch panel display 201, but is not limited thereto. Alternatively, the solenoids 215 and 217 may be wrapped or pass under the touch panel display 201, thus, only two solenoids are enough to generate two orthogonal uniform magnetic fields. The touch panel display 201 displays visual output of the electronic device 200. The touch panel display 201 also include a touch panel that detects touch input using capacitive, resistive, infrared, ultrasonic methods, and the like. The touch panel may receive input from a user finger 305 and/or a stylus (not illustrated).

The solenoids 203, 205, 207, and 209 are mounted to provide a magnetic force parallel to the surface of the touch panel display 201. That is, power applied to the solenoids 203, 205, 207, and 209 provides an orthogonal uniform magnetic field. By altering the amount of power to each of the solenoids 203, 205, 207, and 209 the amount of force applied against a magnet 311 mounted on an end of any of finger sleeve 301, 303, 307 and 309 is varied as the magnet 311 touches different points on the touch panel display 201. Alternatively, as the magnet 311 touches the same points on the touch panel display 201, to simulate some change in an environment, such as wind, running water or an explosion. Thus as a user moves a hand 300 with at least one of finger sleeves 301, 303, 307 and 309 touching the display away from a starting point 211 toward end point 213, the user may be made to feel an increasing force against at least one finger in the at least one of the finger sleeves 301, 303, 307 and 309.

Conversely, as the user moves the hand 300 back to the starting point 211 from the end-point 213 the user may be made to feel a decreasing force against the at least one finger in the at least one of the finger sleeves 301, 303, 307 and 309.

The amount of force exerted against the magnet 311 in the at least one of finger sleeves 301, 303, 307 and 309 may be changed depending on the direction in which the at least one finger in the at least one of finger sleeves 301, 303, 307 and 309 moves in relation to the starting point 211. Thus, the starting point 211 may be found at any point in the touch panel display 201 and may be moved towards the end-point 213. The end-point 213 may likewise, be placed at any point on the touch panel display 201.

While a magnet 311 is illustrated on finger sleeve 301, the magnet 311 is found on each of the finger sleeves 301, 303, 307 and 309. The magnet 311 is not limited to placement on a finger sleeve, but may be mounted on any device, for example, fingertips of a glove, a stylus, and/or a prosthetic device.

Figure 4A:
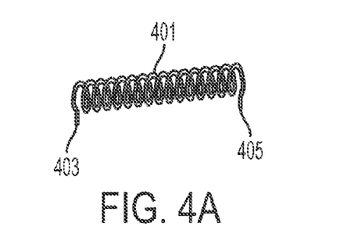
FIG. 4A illustrates a solenoid according to various embodiments of the present disclosure.

FIG. 4A illustrates a solenoid according to various embodiments of the present disclosure.

Referring to FIG. 4A a solenoid 401 is illustrated. The solenoid 401 contains a first end 403 and a second end 405. It will be understood that the magnetic field may be changed by driving electrical power, for example, a first end 403 may receive a negative charge and second end 405 may receive a positive charge, or vice versa. It will be understood by those of ordinary skill in the art that changing the current direction, the poles of the magnetic fields generated by the solenoid 401 will be reversed.

Figure 4B:
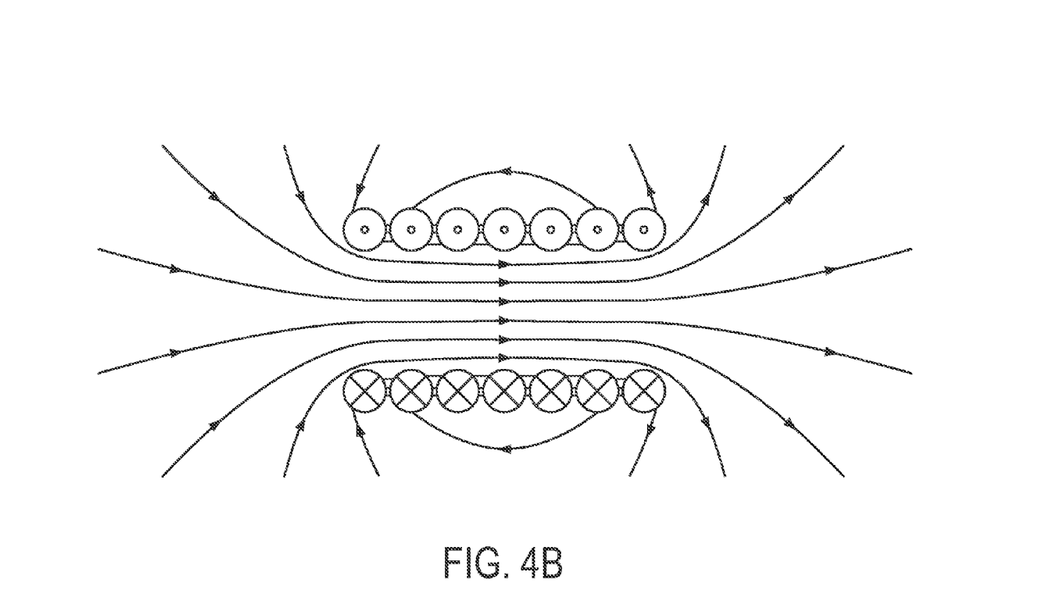
FIG. 4B illustrates a cross sectional view of a magnetic field created by a seven-loop solenoid according to an embodiment of the current disclosure.

FIG. 4B illustrates a cross sectional view of a magnetic field created by a seven-loop solenoid according to an embodiment of the current disclosure.

Referring to FIG. 4B a magnetic field flowing in one direction is illustrated. The magnetic field (the magnetic flux density vector B) may be computed from:

$$B = \mu_0 \frac{N1}{l}.$$

where $\mu_0$ is the magnetic constant, N the number of turns, l is the length of the field and I the current.

Mathematically, the force on a small magnet having a magnetic moment m due to a magnetic field B is $$F = \nabla(m \cdot B),$$

where the gradient $\nabla$ is the change of the quantity m·B per unit distance and the direction is that of maximum increase of m·B.

Therefore, with the magnet 311 of a known moment installed at the tip of the finger sleeves 301, 303, 307 and 309 at a fixed orientation, the only variable the electronic device need to control is the current I supplied to the solenoids 203, 205, 207, and 209.

In the same manner, another uniform magnetic field may be added in an orthogonal direction to a first solenoid. Such a device may generate two orthogonal forces at the magnet 31 at a tip of the finger sleeves 301, 303, 307 and 309. By basic vector mathematics, the electronic device may generate arbitrary force at any direction (parallel to the touch panel display 201).

Figure 5:
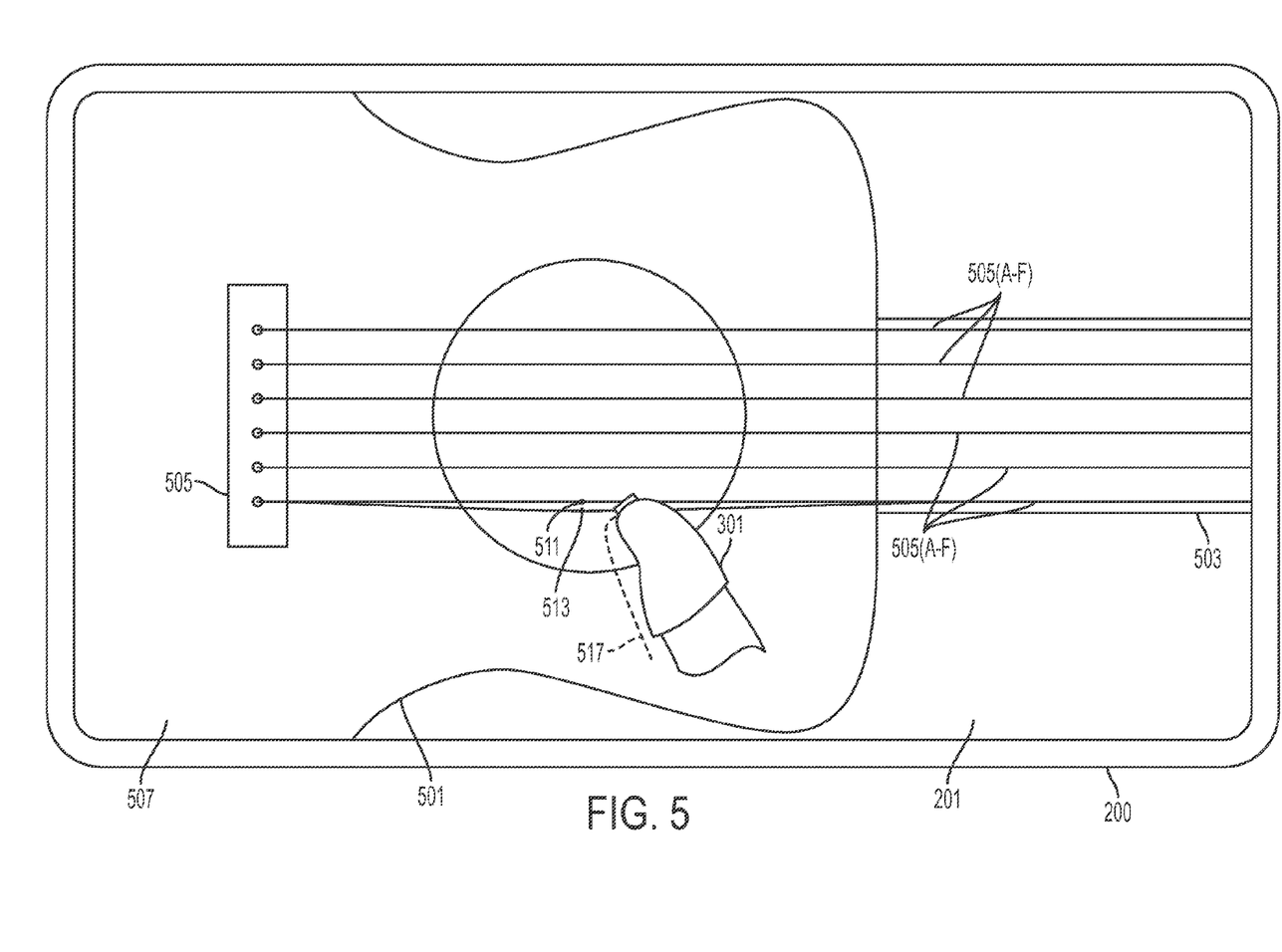
FIG. 5 illustrates an electronic device displaying a guitar application according to an embodiment of the present disclosure.

FIG. 5 illustrates an electronic device displaying a guitar application according to an embodiment of the present disclosure.

Referring to FIG. 5, a guitar 501 of a guitar application executed on the touch panel display 201 of the electronic device 200 is illustrated. The guitar includes a body 507 and a neck 503. The guitar 501 also contains guitar strings 505(a)-(f) which extend from the bridge 509 to the guitar head (not illustrated) containing tuning pegs (not illustrated) for tightening and loosening the guitar strings 505(a)-(f). The guitar application receives input via strumming or other manipulation of the guitar strings 505(a)-(f) via the touch panel display 201 in order to simulate an actual guitar. In response to the input, the electronic device outputs an associated sound via a speaker (not shown).

According to an embodiment of the instant application, a finger sleeve 301 placed on the guitar string 505(f) may be moved to a position 517. The movement of the finger sleeve 301 to the position 517 will cause the guitar string 505(f) to move from a starting point 511 to an end-point 513. In addition to displaying the movement on the touch panel display 201, the guitar application is integrated with the solenoids 203, 205, 207, and 209 via a magnetic field Application Programming Interface (API) to provide resistance (i.e., force) against the movement. Each guitar string 505(a)-(f) is programmed to provide a separate amount of resistance depending on the thickness of each guitar string 505(a)-(f). Thus, depending on the thickness of each guitar string 505(a)-(f) which is manipulated by the finger sleeve 301, the user will experience a different amount of resistance to the movement of the guitar string 505(a)-(f). In this manner the guitar application not only simulates the sound that occurs when one of the guitar string 505(a)-(f) is manipulated but also the feeling of actually moving one of the guitar string 505(a)-(f). In this manner, it will be understood that the guitar strings 505(a)-(f) each have an initial resistance and that resistance will increase as, for example, the guitar string 505(f) is moved further from the starting point 511.

It will be understood that in the guitar application, the strings are manipulated along the y-axis and therefore, the only solenoids that need to be manipulated are those controlling the magnetic field along the y-axis, for example solenoids 207 and 209. However, the magnetic field API may be provide along both the X axe and Y axe, as well as a combination thereof.

Figure 6:
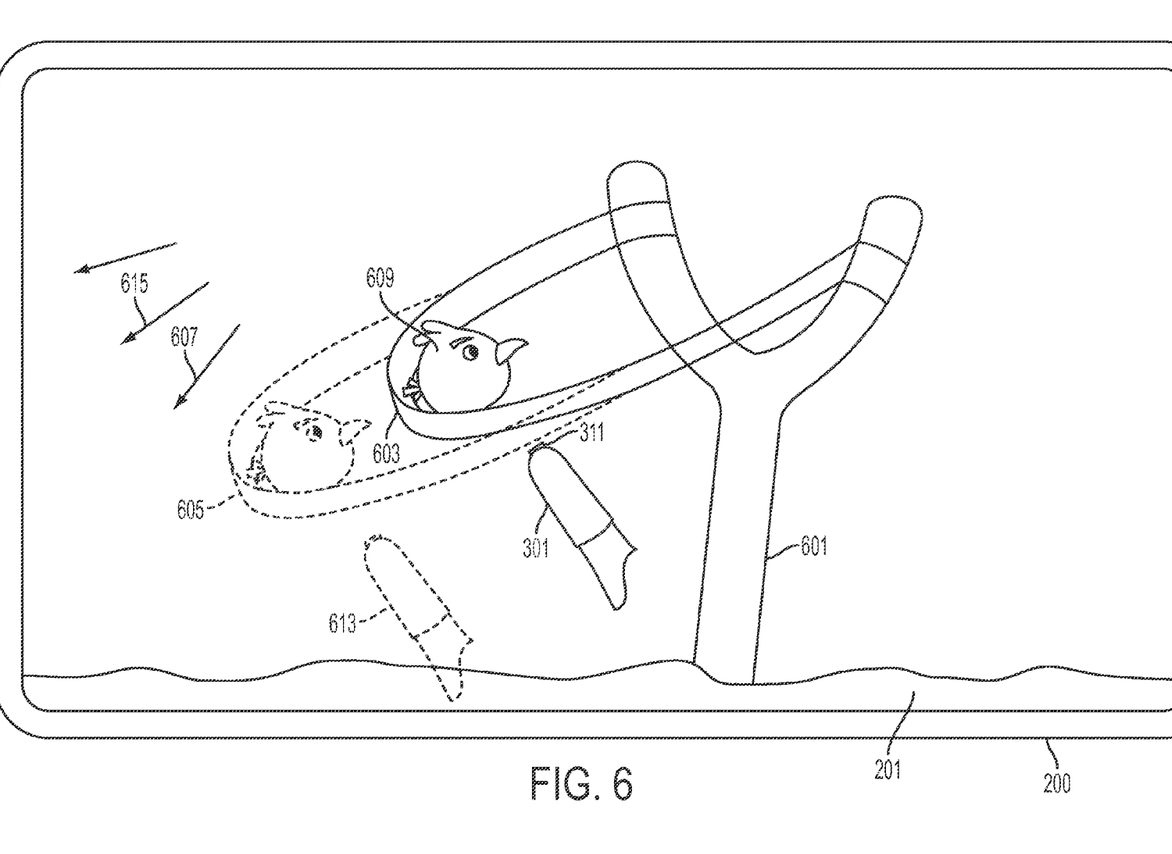
FIG. 6 illustrates an electronic device displaying a game application according to an embodiment of the present disclosure

FIG. 6 illustrates an electronic device displaying a game application according to an embodiment of the present disclosure.

Referring to FIG. 6, a sling shot 601 of a popular game application displayed on the touch panel display 201 of the electronic device 200 is illustrated. The game application has a user launch an icon 609 using the slingshot 601. As with any slingshot, a rubber band is pulled back in order to launch a projectile. In the game application, a user wearing a finger sleeve 301 draws a rubber band 603 back diagonally in a direction 607 till the finger sleeve is in a position 613 and the rubber is in position 605. As the finger sleeve 301 pulls the rubber band 603 back, a greater force is exerted against the magnet 311 in the finger sleeve 301. In this manner, the user experiences a force exerted against them as the user of an actual slingshot would feel while pulling back on the rubber band of the slingshot. When the user removes the finger sleeve 301 from the touch panel display, it will be understood that the icon 609 will be shot in a direction opposite of the direction 607 as the rubber band 603 retracts.

As the direction 607 is diagonal (roughly a 45 angle), the game application via the magnetic field API will determine the amount of force applied against the magnet 311 in the finger sleeve 301 and translate that into the same amount of current I applied to solenoids 207 and 209 and also to solenoids 203 and 205.

However, it will also be understood when the direction 615 is used (roughly a 75° angle), the amount of force required on the X-axis will be greater than that required on the Y-axis. Therefore, the solenoid 203 and 205 would receive a greater increase in the current I as the rubber band 603 is pulled back than the increase in current I to the solenoid 207 and 209 to counteract the magnet 311 of the finger sleeve 301.

While the direction of pulling a rubber band illustrated by directions 607 and 615 depict movement toward the left hand side of the electronic device 200. However, the direction in which the finger sleeve 301 is pulled across the touch panel display 201 is not limited thereto and the current I applied to each of the solenoids 203, 205, 207, and 209 may be varied to provide resistance in the direction opposite the user moves the finger sleeve 301 as required by any particular application.

Conversely, there may case where an application that wishes to pull the finger sleeve 301 in a certain direction and the current I applied to each of the solenoids 203, 205, 207, and 209 may be reversed in order to provide such a feature.

Figure 7:
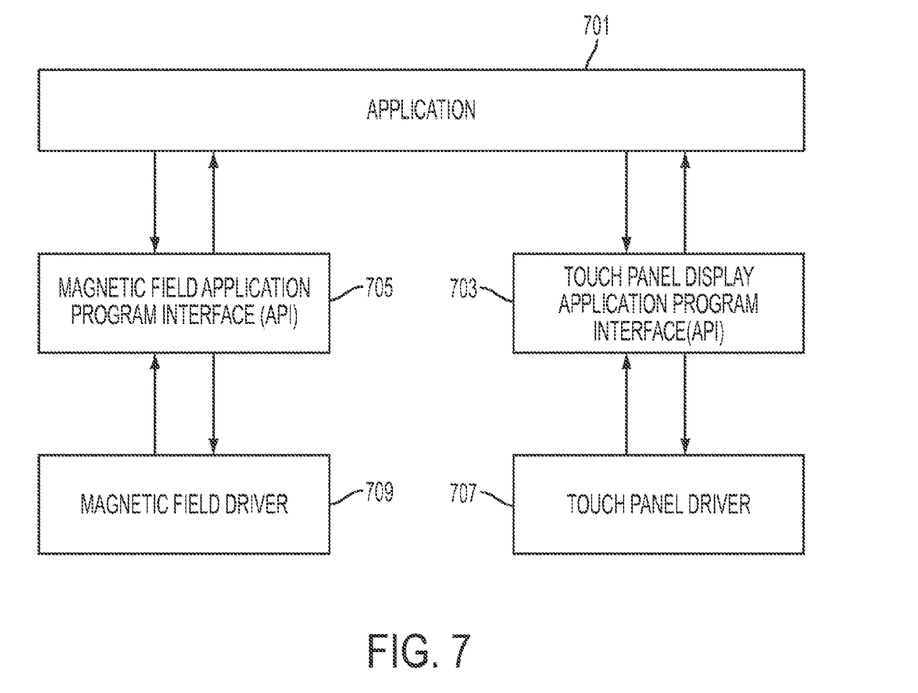
FIG. 7 illustrates a block diagram of software components according to various embodiments of the present disclosure.

FIG. 7 illustrates a block diagram of software components according to various embodiments of the present disclosure.

Referring to FIG. 7, an application 701, such as the guitar application or the game application is integrated with the touch panel display 201 and the solenoids 203, 205, 207, and 209 via a touch panel display Application Program Interface (API) 703 and a magnetic field API 705 respectively. The touch panel display API is connected to a touch panel display driver 707 that transmits display information to, and receives touch input from, the touch panel display 201.

The magnetic field API 705 is connected to a magnetic field driver 709 for driving separate currents I to each of the solenoids 203, 205, 207, and 209 depending on force that needs to be applied to the magnet 311 on the finger sleeve 301 in a particular direction on the touch panel display 201.

Hereinafter, as an example, the application 701 is the guitar application as in FIG. 5. The application 701 in execution wishes to display the guitar string 505(f). The application 701 sends a command via the touch panel display API 703 to display the string on the guitar string 505(f) on the touch panel display 201.

Upon the user touching the guitar string 505(f) on the touch panel display 201 the touch panel display API 703 receives input via the touch panel display driver 707 that movement is occurring on the touch panel display 201. This touch input is transferred to the application 701. The application 701 determines that the touch input is at a coordinate that coincides with the location of the guitar string 505(f) and that touch input received via the touch panel display API 703 indicates that that the movement is in a particular direction. The application 701 determines that the guitar string 505(f) must be redisplayed to compensate for the movement and also increase a force against the magnet 311 on the finger sleeve 301. In response, the application 701 via the magnetic field API 705 increases the force in a direction opposite the direction in which the movement of the magnet on the finger sleeve 301 is travelling.

The magnetic field API 705 based on these instructions changes the current I to each of the solenoids 203, 205, 207, and 209. For example, the magnetic field API 705 could be instructed to increase the force by a particular percentage, in a particular direction, from a particular X/Y coordinate on the touch panel display 201. (See FIG. 4B).

The magnetic field API 705 in response determines the change in current I that needs to be made to each of the solenoids 203, 205, 207, and 209. Once those changes are determined, the magnetic field API 705 transmits this information the magnetic field driver 709 which adjusts the current I to each of the solenoids 203, 205, 207, and 209. In response, the user, in this example, feels a greater force against the magnet 311 of the finger sleeve 301 as the guitar string 505(f) is moved.

While the above example illustrates a guitar application with respect to a single guitar string, it will be understood by those of ordinary skill in the art, that any object displayed on touch panel display 201 is capable of having a force applied against the object in any direction, with any given amount of force, when the user of the electronic device 200 wears the finger sleeve 301 and attempts to move the object on the touch panel display 201. Thus, the developer of the application 701 integrates the touch panel display 201 with the solenoids 203, 205, 207, and 209 via the respective touch panel display API and magnetic field API.

Figure 8:
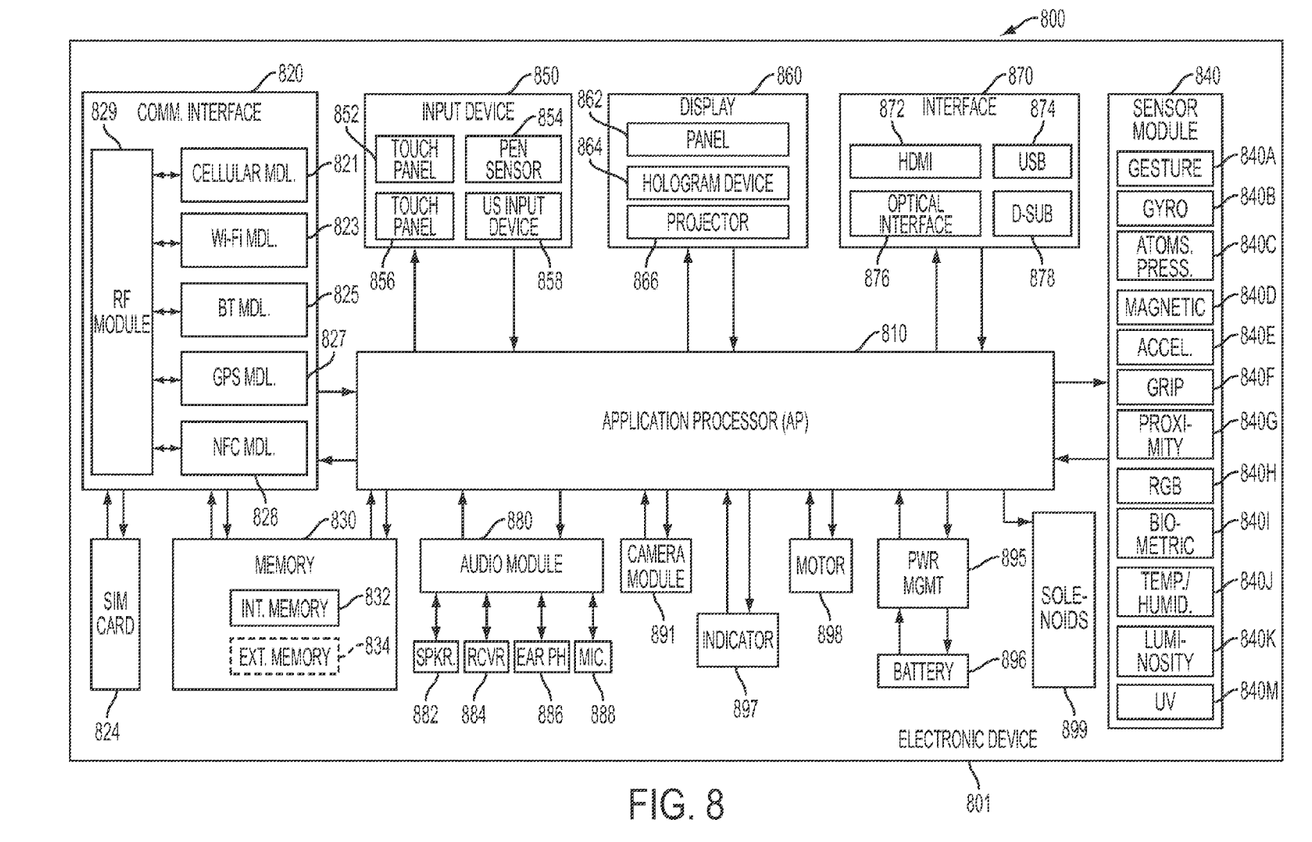
FIG. 8 illustrates a block diagram of hardware according to various embodiments of the present disclosure.

FIG. 8 illustrates a block diagram of hardware according to various embodiments of the present disclosure.

Referring to FIG. 8, hardware 801 may be, for example, a part or the entire parts of the electronic device 101. Referring to FIG. 8, the hardware 801 may include one or more Application Processors (AP) 810, a communication module 820, a Subscriber Identification Module (SIM) card 824, a memory 830, a sensor module 840, an input module 850, a display module 860, an interface 870, an audio module 880, a camera module 891, a power management module 895, a battery 896, an indicator 897, a motor 898, and/or the like.

The AP 810 may control one or more hardware or software components that are connected to AP 810, perform processing or computation of data (including multimedia data), and/or the like. As an example, the AP 810 may be implemented as a System-on-Chip (SoC). The AP 810 may include a Graphics Processing Unit (GPU) (not shown).

The communication module 820 (e.g., the communication interface 160) may transmit and receive data in communications between the electronic device 101 and other electronic devices (e.g., the electronic device 104, the server 106, and/or the like). As an example, the communication module 820 may include one or more of a cellular module 821, a Wi-Fi module 823, a Bluetooth module 825, a GPS module 827, a NFC module 828, a Radio Frequency (RF) module 829, and/or the like.

The cellular module 821 may provide services such as, for example, a voice call, a video call, a Short Messaging Service (SMS), internet service, and/or the like, via a communication network (e.g., LTE, LTE-A, CDMA, WCDMA, UMTS, WiBro, GSM, and/or the like). As an example, the cellular module 821 may differentiate and authorize electronic devices within a communication network using a Subscriber Identification Module (SIM) card (e.g., the SIM card 824). According to various embodiments of the present disclosure, the cellular module 821 may perform at least a part of the functionalities of the AP 810. For example, the cellular module 821 may perform at least a part of multimedia control functionality.

According to various embodiments of the present disclosure, the communication interface 820 and/or the cellular module 821 may include a Communication Processor (CP). As an example, the cellular module 821 may be implemented as SoC.

Although FIG. 8 illustrates components such as the cellular module 821 (e.g., CP), the memory 830, the power management module 895 as components that are separate from the AP 810, according to various embodiments of the present disclosure, the AP 810 may include, or be integrated with, one or more of the foregoing components (e.g., the cellular module 821).

According to various embodiments of the present disclosure, the AP 810, the cellular module 821 (e.g., CP), and/or the like, may process instructions or data received from at least one of non-volatile memory or other components by loading in volatile memory. The AP 810, the cellular module 821, the communication interface 820, and/or the like, may store at non-volatile memory at least one of data that is received from at least one of other components or data that is generated by at least one of the other components.

Each of the Wi-Fi module 823, the Bluetooth module 825, the GPS module 827, the NFC module 828, and/or the like may, for example, include one or more processors that may process data received or transmitted by the respective modules. Although FIG. 8 illustrates the cellular module 821, the Wi-Fi module 823, the Bluetooth module 825, the GPS module 827, and the NFC module 828 as separate blocks, according to various embodiments of the present disclosure, any combination (e.g., two or more) of the cellular module 821, the Wi-Fi module 823, the Bluetooth module 825, the GPS module 827, the NFC module 828, and/or the like may be included in an Integrated Chip (IC) or an IC package. For example, at least some of the processors corresponding to the respective the cellular module 821, the Wi-Fi module 823, the Bluetooth module 825, the GPS module 827, the NFC module 828, and/or the like, may be implemented as a single SoC. For example, a CP corresponding to the cellular module 821 and a Wi-Fi processor corresponding to Wi-Fi module 823 may be implemented as a single SoC.

The RF module 829 may, for example, transmit and receive RF signals. Although not shown, the RF module 829 may include a transceiver, a Power Amp Module (PAM), a frequency filter, a Low Noise Amplifier (LNA), and/or the like. The RF module 834 may include one or more components for transmitting and receiving Electro-Magnetic (EM) waves (e.g., in free space or the like) such as, for example, conductors or conductive wires. Although FIG. 8 illustrates that the cellular module 821, the Wi-Fi module 823, the Bluetooth module 825, the GPS module 827, and the NFC module 828 are sharing one RF module 829, according to various embodiments of the present disclosure, at least one of the cellular module 821, the Wi-Fi module 823, the Bluetooth module 825, the GPS module 827, the NFC module 828, and/or the like may transmit and receive RF signals via a separate RF module.

The SIM card 824 may be a card implementing a SIM, and may be configured to be inserted into a slot disposed at a specified location of the electronic device. The SIM card 824 may include a unique identifier (e.g., Integrated Circuit Card IDentifier (ICCID)) subscriber information (e.g., International Mobile Subscriber Identity (IMSI)), and/or the like.

The memory 830 (e.g., memory 130) may include an internal memory 832, an external memory 834, or a combination thereof.

According to various embodiments of the present disclosure, the internal memory 832 may be, for example, at least one of volatile memory (e.g., Dynamic Random Access Memory (DRAM), Static Random Access Memory (SRAM) or Synchronous Dynamic Random Access Memory (SDRAM)), non-volatile memory (e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory), and/or the like.

According to various embodiments of the present disclosure, the internal memory 832 may be a Solid State Drive (SSD). As an example, the external memory 834 may be a flash drive (e.g., Compact Flash (CF drive), Secure Digital (SD), micro Secure Digital (micro-SD), mini Secure Digital (mini-SD), extreme Digital (xD), Memory Stick, and/or the like). The external memory 834 may be operatively coupled to electronic device 801 via various interfaces. According to various embodiments of the present disclosure, the electronic device 801 may include recording devices (or recording media) such as, for example, Hard Disk Drives (HDD), and/or the like.

The sensor module 840 may measure physical/environmental properties detect operational states associated with electronic device 801, and/or the like, and convert the measured and/or detected information into signals such as, for example, electric signals or electromagnetic signals. As an example, the sensor module 840 may include at least one of a gesture sensor 840A, a gyro sensor 840B, an atmospheric pressure sensor 840C, a magnetic sensor 840D, an accelerometer 840E, a grip sensor 840F, a proximity sensor 840G, an RGB sensor 840H, a biometric sensor 840I, a temperature/humidity sensor 840J, a luminosity sensor 840K, a Ultra Violet (UV) sensor 840M, and/or the like. The sensor module 840 may detect the operation state of the electronic device and/or measure physical properties, and convert the detected or measured information into electrical signals. Additionally or alternatively, the sensor module 840 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 840 may also include control circuitry for controlling one or more sensors included therein.

The input module 850 may include a touch panel 852, a (digital) pen sensor 854, a key 856, an ultrasonic input device 858, and/or the like.

As an example, the touch panel 852 may detect touch input using capacitive, resistive, infrared, ultrasonic methods, and/or the like. The touch panel 852 may also include a touch panel controller (not shown). As an example, a capacitive-type touch panel may detect proximity inputs (e.g. hovering input) in addition to, or as an alternative to, physical touch inputs. The touch panel 852 may also include a tactile layer. According to various embodiments of the present disclosure, the touch panel 852 may provide haptic feedback to the user using the tactile layer.

As an example, the (digital) pen sensor 854 may be implemented using methods identical to or similar to receiving a touch input from a user, or using a separate detection sheet (e.g., a digitizer).

As an example, the key 856 may be a keypad, a touch key, and/or the like.

As an example, the ultrasonic input device 858 may be a device configured to identify data by detecting, using a microphone (e.g., microphone 888), ultrasonic signals generated by a device capable of generating the ultrasonic signal. The ultrasonic input device 858 may detect data wirelessly.

According to various embodiments of the present disclosure, the electronic device 801 may receive user input from an external device (e.g., a network, computer or server) connected to the electronic device 801 using the communication module 820.

The display module 860 (e.g., display 150) may include a panel 862, a hologram device 864, a projector 866, and/or the like. As an example, the panel 862 may be, for example, a Liquid-Crystal Display (LCD), an Active-Matrix Organic Light-Emitting Diode (AM-OLED) display, and/or the like. As an example, the panel 862 may be configured to be flexible, transparent, and/or wearable. The panel 862 and the touch panel 852 may be implemented as a single module. The hologram device 864 may provide a three-dimensional image. For example, the hologram device 864 may utilize the interference of light waves to provide a three-dimensional image in empty space. The projector 866 may provide image by projecting light on a surface (e.g., a wall, a screen, and/or the like). As an example, the surface may be positioned internal or external to electronic device 801. According to various embodiments of the present disclosure, the display module 860 may also include a control circuitry for controlling the panel 862, the hologram device 864, the projector 866, and/or the like.

The interface 870 may include, for example, one or more interfaces for a High-Definition Multimedia Interface (HDMI) 872, a Universal Serial Bus (USB) 874, a projector 876, or a D-subminiature (D-sub) 878, and/or the like. As an example, the interface 870 may be part of the communication interface 820. Additionally or alternatively, the interface 870 may include, for example, one or more interfaces for Mobile High-definition Link (MHL), Secure Digital (SD)/MultiMedia Card (MMC), Infrared Data Association (IrDA), and/or the like.

The audio module 880 may encode/decode sound into electrical signal, and vice versa. According to various embodiments of the present disclosure, at least a portion of audio module 880 may be part of the I/O interface 140. As an example, the audio module 880 may encode/decode voice information that is input into, or output from, the speaker 882, the receiver 884, the earphone 886, the microphone 888, and/or the like.

The camera module 891 may capture still images and/or video. According to various embodiments of the present disclosure, the camera module 891 may include one or more image sensors (e.g., front sensor module, rear sensor module, and/or the like) (not shown), an Image Signal Processor (ISP) (not shown), or a flash (e.g., Light-Emitting Diode (flash LED), xenon lamp, and/or the like) (not shown).

The power management module 895 may manage electrical power of the electronic device 801. Although not shown, the power management module 895 may include, for example, a Power Management Integrated Circuit (PMIC), a charger Integrated Circuit (charger IC), a battery gauge, a fuel gauge, and/or the like.

As an example, the PMIC may be disposed in an integrated circuit or an SoC semiconductor. The charging method for the electronic device 801 may include wired or wireless charging. The charger IC may charge a battery, may prevent excessive voltage or excessive current from a charger from entering the electronic device 801, and/or the like. According to various embodiments of the present disclosure, the charger IC may include at least one of a wired charger IC or a wireless charger IC. As an example, the wireless charger IC may be a magnetic resonance type, a magnetic induction type, an electromagnetic wave type, and/or the like. As an example, the wireless charger IC may include circuits such as a coil loop, a resonance circuit, a rectifier, and/or the like.

As an example, the battery gauge may measure a charge level, a voltage while charging, a temperature of battery 896, and/or the like.

As an example, the battery 896 may supply power to the electronic device 801. As an example, the battery 896 may be a rechargeable battery, a solar battery, and/or the like.

The indicator 897 may indicate one or more states (e.g., boot status, message status, charge status, and/or the like) of the electronic device 801 or a portion thereof (e.g., AP 810). Motor 898 may convert an electrical signal into a mechanical vibration.

Solenoids 899 provide a force against a magnet, the force being driven parallel to a surface of the display 860.

Although not shown, the electronic device 801 may include one or more devices for supporting mobile television (mobile TV) (e.g., a Graphics Processing Unit (GPU)), and/or the like. The devices for supporting mobile TV may support processing of media data compliant with, for example, Digital Multimedia Broadcasting (DMB), Digital Video Broadcasting (DVB), media flow, and/or the like.

It will be appreciated that various embodiments of the present disclosure according to the claims and description in the specification may be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. An apparatus for providing feedback to a user of an electronic device, the apparatus comprising:
    a magnetic user input device configured to receive a force from a magnetic field;
    a touch panel display configured to display application output and to receive application input;
    a series of solenoids positioned on each side of the touch panel display or below the touch panel display, the series of solenoids configured to output a magnetic field; and
    a programmed processor configured to:
        execute an application that displays the application output via the touch panel display,
        drive, in response to input received from the touch panel, a separate current to each solenoid of the series of solenoids to apply a force against the magnetic user input device, and
    increase or decrease the assigned resistance when the display object is moved by the magnetic user input device,
    wherein the application output includes a display object,
    wherein the display object is assigned a resistance that corresponds to a perceived mass of the object, and
    wherein the force applied against the magnetic user input device corresponds to the assigned resistance.

2. The apparatus of claim 1, wherein the input received from the touch panel corresponds to the movement of the magnetic user input device.

3. The apparatus of claim 1, wherein the magnetic user input device is at least one finger sleeve worn on at least one finger of the user of the magnetic device.

4. The apparatus of claim 3, wherein the at least one finger sleeve comprises a magnet of a known moment placed at the tip of the at least one finger sleeve.

5. The apparatus of claim 1, wherein the magnetic user input device is a stylus.

6. The apparatus of claim 1, wherein the programmed processor is further configured to vary a current to each solenoid of the series of solenoids.

7. A method of providing feedback to a user of an electronic device, the method comprising:
    displaying application output and receiving application input on a touch panel display;
    receiving a force against a magnetic user input device from a magnetic field driven about the touch panel display in response to an application responding to the displayed application output and the received application input; and
    increasing or decreasing the assigned resistance when the display object is moved by the magnetic user input device,
    wherein the magnetic field is driven by a series of solenoids positioned on each side of the touch panel display or below the touch panel display,
    wherein the application output includes a display object,
    wherein the display object is assigned a resistance that corresponds to a perceived mass of the object, and
    wherein the force applied against the magnetic user input device corresponds to the assigned resistance.

8. The method of claim 7, wherein the input received from the touch panel corresponds to the movement of the magnetic user input device.

9. The method of claim 7, wherein the magnetic user input device is at least one finger sleeve worn on at least one finger of the user of the magnetic device.

10. The method of claim 9, wherein the at least one finger sleeve comprises a magnet of a known moment placed at the tip of the at least one finger sleeve.

11. The method of claim 7, wherein the magnetic user input device is a stylus.

12. The method of claim 7, wherein the application varies a current to each solenoid of the series of solenoids.

* * * * *